Sept. 1, 1936.  B. LANGLOTZ  2,053,198

FRUIT PACKER

Filed Nov. 1, 1934  2 Sheets-Sheet 1

Inventor,
Barney Langlotz,
By Thurs. Ahleman
Attorney

Sept. 1, 1936.   B. LANGLOTZ   2,053,198
FRUIT PACKER
Filed Nov. 1, 1934   2 Sheets-Sheet 2
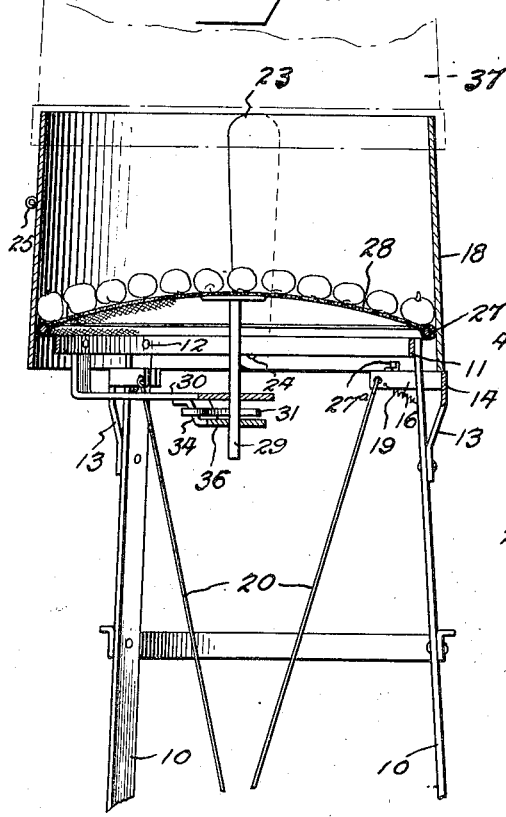
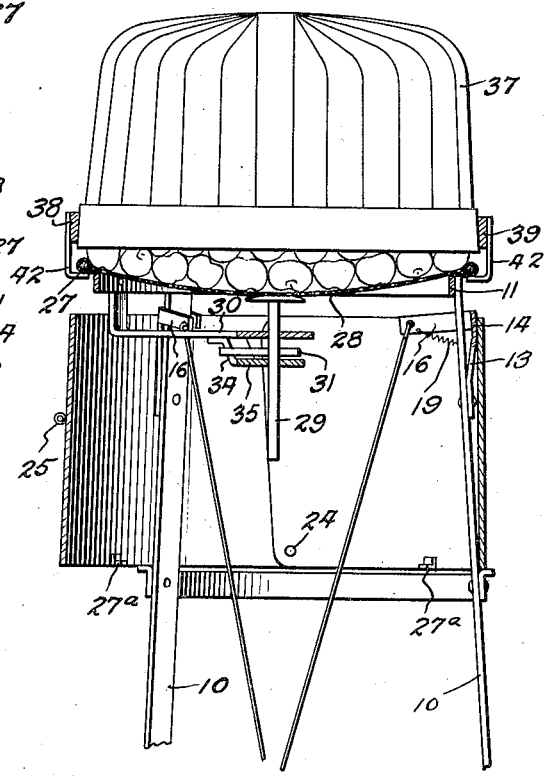
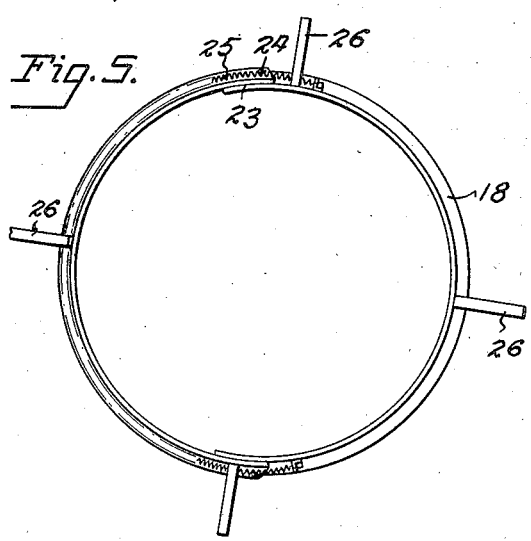
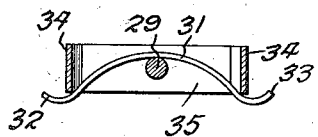
Inventor,
Barney Langlotz,
By Franks Addleman
Attorney Patented Sept. 1, 1936

2,053,198

UNITED STATES PATENT OFFICE 2,053,198

FRUIT PACKER

Barney Langlotz, Bangor, Mich.

Application November 1, 1934, Serial No. 751,084

3 Claims. (Cl. 226—17)

This invention relates to fruit packing devices, and particularly to means for holding assembled fruit in packed formation, and thereafter transferring it to a container, such as a basket, the said device being provided with means for holding the fruit in the basket while the basket is being transferred from an inverted to an upright position.

It is a further object of this invention to provide novel means for holding a shell, which is substantially the form in which the fruit is to be collected and held prior to its being transferred to a basket, in operative relation to a support which may be said to comprise the bottom of the shell, so that fruit is held therein during the time the inverted basket is applied to the shell and pressed thereon to a degree where the mouth of the basket is in such relation to the bottom of the shell that fruit cannot escape from the basket and said bottom when the shell is lowered, leaving the fruit in the basket; the said invention furthermore contemplating the provision of novel means for engaging the bottom which now becomes the temporary closure for the basket while the said basket is being moved to its upright position.

It is a still further object of this invention to provide novel means for flexing the temporary bottom of the shell, in order that fruit will gravitate toward the side or wall of the shell to insure close packing of the fruit so that manipulation of the fruit will not be necessary to provide a proper settling of the fruit in approximate courses within the shell.

It is furthermore an object of this invention to provide novel means for holding the parts in operative position during certain phases of the operation of the device and then to release the same when other steps of the operation are to be performed.

It is a still further object of the invention to provide a fruit packer of the character indicated which will comprise comparatively few and inexpensive parts that will prove efficient and satisfactory in use.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 3 illustrates a sectional view on the line 3—3 of Fig. 2;

Figure 4 illustrates a view in elevation of the upper part of the packer, showing a basket in position to have the fruit transferred to it;

Figure 5 illustrates a plan view of the shell; and

Figure 6 illustrates a sectional view of the post and parts associated with it, on a line above the spring for retaining the post.

Figure 1:
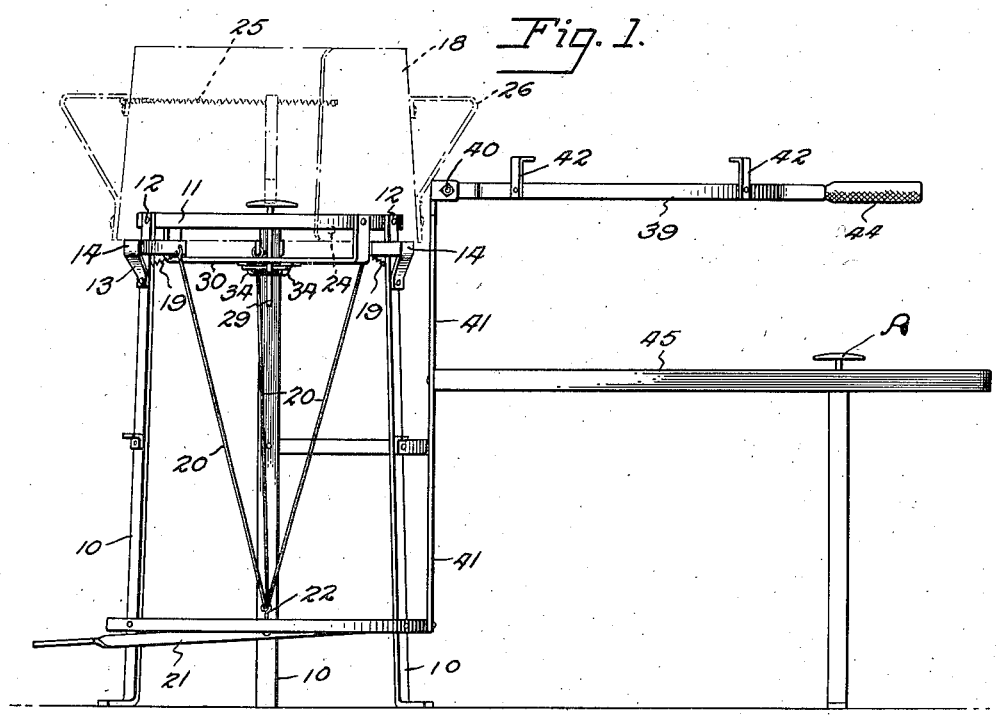
Figure 1 illustrates a view in elevation of a fruit packing machine.
Figure 2:
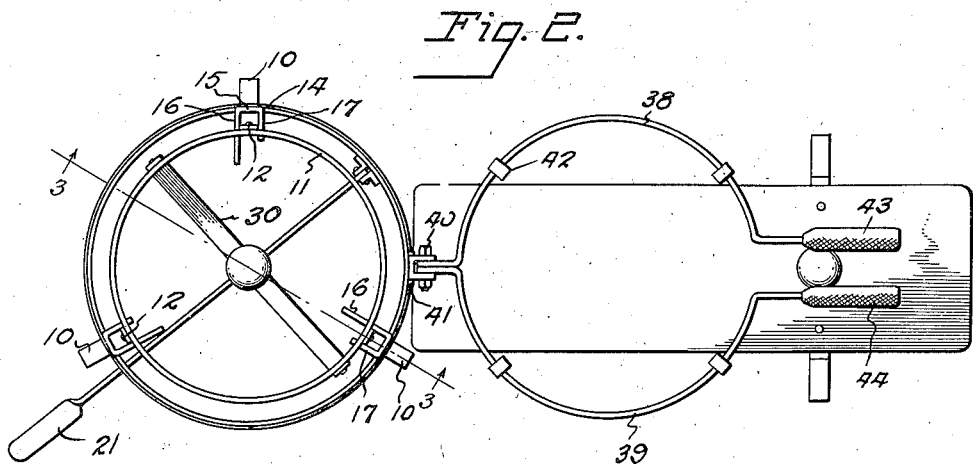
Figure 2 illustrates a plan view thereof.

The frame of the machine may be provided with three or more legs 10, of metal or the like, having a ring 11 secured to them at their upper ends in any appropriate way, as by fastenings 12, such as rivets or the like.

In the present embodiment of the invention, each leg has a spring 13 secured to it, or the member 13 may be in the nature of a flexible arm, to each of which a support 14 is attached. The support 14 is here shown as formed from a metal strip which is bent so that it has a central portion 15 attached to the member 13 and two parallel portions 16 and 17 which embrace one of the legs, the said parallel portions forming supports for a shell 18, into which the fruit is packed initially. The member 15 and its arm is under tension of a spring 19 normally operative to hold the support in its outward position in which it will hold the shell. Rods or other members 20 are supplied, one of which is connected to each of the supports and to a treadle 21 through the connection 22, and when the treadle is actuated by the foot of an operator, it will tend to pull the supports inwardly within the circumference of the shell and the shell can then be lowered, for a purpose to be presently explained.

The shell comprises preferably a cylindrical metal member having a loose joint where its edges overlap, as at 23, and preferably the material forming the member is secured at the lower edge by a pivot 24 which may be a rivet or the like. The overlapping portions are not secured fixedly at their upper edges but are held yieldingly by a spring 25, one end of which is anchored to the shell on one side of the joint and the other end of which is anchored to the shell on the opposite side of the joint, so that the upper edge of the shell is free to expand, within predetermined bounds, to the approximate internal diameter of the receptacle into which the fruit is to be delivered after it is packed in the shell. Suitable handles 26 are provided for the shell to facilitate its manipulation.

A flexible loose bottom is provided for the shell and it preferably consists of a metallic ring 27 and a flexible diaphragm-like covering 28 which can be flexed to convex form within the shell, as shown in Fig. 3, in order that fruit delivered to the shell will tend to gravitate to the wall of the shell, forming a crown in the center of the pack. The shell has cleats 27a which support the loose bottom, and the loose bottom is also supported by the ring 11 when the shell is lowered and the cleats release the said loose bottom.

The member 28 may be flexed to a greater or lesser degree by employing an adjustable post 29 which is slidable in a bracket 30 projecting from a frame member, the said post being held at different positions of adjustment by a friction element 31 which is in the nature of a spring having its ends 32 and 33 engaged by the downwardly extended parts 34 of another bracket 35 that is attached to a bracket 36 in any appropriate way, as by mechanical fastenings or spot welding or the like. Since the manner of securing the bracket 35 to the bracket 36 may be accomplished in different ways, it is believed unnecessary to show the same in detail.

As has been stated, the post 29 may be moved vertically and held at different positions and therefore, the convexity of the bottom 28 will be changed as desired.

When the shell has been loaded and the fruit is to be transferred to a receptacle such as a basket, a basket 37 is inverted and its open end is slid downwardly over the shell until the space between the open end of the basket and the temporary bottom of the shell is in such relation that if the shell is displaced fruit cannot escape. When this adjustment has been attained, the treadle is actuated to operate the supports of the shell so that it is free to move downwardly, as it is shown in Fig. 4, at which time the basket and bottom 28 are in operative relation to confine the fruit. Thereafter the post can be adjusted to permit the flexible bottom to assume a convex position and the fruit will then assume a like position, and the fruit in the basket will have a crowned effect which is the desired result. After this manipulation has occurred, the basket may be removed from the packing stand.

In order to facilitate the removal of the basket in its packed state from the packing stand, a yoke is provided which is formed of two semicircular, preferably metallic, members 38 and 39 having their inner ends shaped so that they lie parallel to each other and they are mounted on a pivot 40 suitably anchored to the frame or a portion thereof. In fact, in the present embodiment, a post 41 is secured to the frame or portions thereof and the yoke to the upper end thereof. Each yoke member 38 and 39 is preferably provided with hook-like members 42, the hooks of which are applied to the under side of the frame of the removable bottom, and as the yoke is swung on its pivot through the manipulation of its handles 43 and 44, the basket can be righted or moved from its inverted to its upright position and deposited with its bottom on a receiving bracket or board 45, the construction of which is fully shown.

It is shown that springs 19 have been provided for holding the supports in operative position to engage the shell but if, as suggested, the member 13 is of material having a spring action, the device would operate without the necessity of having the additional springs 19.

The bracket or board 45 is provided with a post and head A similar to the post 29 to hold the flexible bottom in desired position.

In the practical operation of the machine, it will be desirable to have a plurality of shells and center parts to increase the output, but only one machine will be needed for each operator.

The bracket or board 45 with the post 29 is to be used to facilitate the packing and handling of fruit for, by the use of a number of shells with their flexible bottoms, the shells may be placed on the board and the bottom will be supported centrally by the post A and the rim of the bottom will of course be supported by the cleats 27a, a plurality of which is provided on the inner surface of the shells near the bottoms thereof. When fruit is packed in the shells when on the board 45 the shells are transferred to the machine and thereafter the containers are applied to the shells. By this means, several packers may be employed in filling shells which will be successively transferred to the machine and then to the containers.

I claim:

1. In a fruit packer, an expansible shell in which fruit is collected, a flexible bottom therefor, cleats on the shell for engaging the bottom and holding it therein, means for supporting the shell, means for operating the supports to disengage the shell, means for transferring the fruit in the shell to a container inverted over the shell and movable downwardly thereover as the shell is lowered below said bottom, and a yoke for clamping the container, the said yoke having means for engaging the temporary bottom and holding it in relation to the container to prevent the fruit from escaping from the container, means for pivotally supporting the yoke whereby it may be swung upwardly to carry the container to an upright position, and a support on which the container is deposited in its upright position.

2. In a fruit packing apparatus, a suitable frame, a ring supported by the frame, a shell encompassing the ring, yieldable means for holding the shell in operative relation to the ring and for releasing the said shell, a flexible bottom for the shell, adjustable means on the frame engaging the bottom for supporting it centrally in a convex position, means for clamping a container and holding the bottom in operative relation to the container, and means for oscillatably mounting the clamping member for moving the container to an upright position.

3. In a fruit packing apparatus, a suitable frame, a ring supported by the frame, a shell encompassing the ring, yieldable means for holding the shell in operative relation to the ring and for releasing the said shell, a flexible bottom for the shell, adjustable means on the frame engaging the bottom for supporting it centrally in a convex position, said means comprising a post engaging the flexible bottom and means for holding the post at different positions of adjustment, means for clamping a container and holding the bottom in operative relation to the container, and means for oscillatably mounting the clamping member for moving the container to an upright position.

BARNEY LANGLOTZ.